US011533247B2

(12) United States Patent
Saxena et al.

(10) Patent No.: US 11,533,247 B2
(45) Date of Patent: Dec. 20, 2022

(54) METHODS, SYSTEMS, AND COMPUTER READABLE MEDIA FOR AUTONOMOUS NETWORK TEST CASE GENERATION

(71) Applicant: Oracle International Corporation, Redwood Shores, CA (US)

(72) Inventors: Varun Saxena, Bangalore (IN); Venkatesh Aravamudhan, Bangalore (IN); Kawal Sapra, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/207,393

(22) Filed: Mar. 19, 2021

(65) Prior Publication Data

US 2022/0303206 A1 Sep. 22, 2022

(51) Int. Cl.
*H04L 43/50* (2022.01)
*G06N 20/00* (2019.01)
(Continued)

(52) U.S. Cl.
CPC .......... *H04L 43/50* (2013.01); *G06N 20/00* (2019.01); *H04L 41/0631* (2013.01); *H04L 43/04* (2013.01); *H04L 43/062* (2013.01)

(58) Field of Classification Search
CPC ....... H04L 43/50; H04L 43/062; H04L 43/04; H04L 41/0631; H04L 41/47; G06N 20/00
See application file for complete search history.

(56) References Cited

U.S. PATENT DOCUMENTS

| 6,415,396 B1* | 7/2002 | Singh | G06F 11/3688 714/33 |
| 7,568,133 B1* | 7/2009 | Bette | H04L 41/06 379/9.03 |

(Continued)

FOREIGN PATENT DOCUMENTS

| CN | 102111801 A | 6/2011 |
| CN | 110048904 A | 7/2019 |

(Continued)

OTHER PUBLICATIONS

"4G 5G Core Network Testing," Polaris Networks, https://www.polarisnetworks.net/4g-5g-core-network-testing.html, pp. 1-3 (Sep. 14, 2020).

(Continued)

*Primary Examiner* — Nam T Tran
(74) *Attorney, Agent, or Firm* — Jenkins, Wilson, Taylor & Hunt, P.A.

(57) ABSTRACT

A method for autonomously generating network function test cases includes detecting a failure case in a network function of a core network of a telecommunications network. The method includes, in response to detecting the failure case, autonomously generating a network function test case based on the failure case. The network function test case includes one or more network status parameters detected when detecting the failure case. The method includes supplying the network function test case to a network testing system configured for executing the network function test case by repeating the one or more network status parameters and determining whether or not the network function repeats the failure case.

16 Claims, 4 Drawing Sheets

(51) Int. Cl.
*H04L 41/0631* (2022.01)
*H04L 43/062* (2022.01)
*H04L 43/04* (2022.01)

(56) References Cited

U.S. PATENT DOCUMENTS

| | | | |
|---|---|---|---|
| 9,047,414 B1* | 6/2015 | Matyjek | G06F 11/3692 |
| 2002/0162059 A1 | 10/2002 | McNeely et al. | |
| 2008/0126880 A1* | 5/2008 | Hegarty | G06F 11/3684 |
| | | | 714/46 |
| 2014/0325278 A1 | 10/2014 | Omar | |
| 2016/0217022 A1 | 7/2016 | Velipasaoglu et al. | |
| 2019/0230021 A1* | 7/2019 | Shankar | H04L 41/069 |
| 2019/0361759 A1* | 11/2019 | Haugen | H04L 41/0631 |
| 2019/0372873 A1* | 12/2019 | Beeram | H04L 41/0631 |
| 2021/0399972 A1* | 12/2021 | Nguyen | H04L 43/50 |

FOREIGN PATENT DOCUMENTS

| JP | 2015215677 A | 12/2015 |
|---|---|---|
| KR | 1020200046415 | 5/2020 |

OTHER PUBLICATIONS

"NetTest 5G Core Network Functional Testing," Polaris Networks, https://www.polarisnetworks.net/5g-functional-testers.html, pp. 1-3 (Sep. 14, 2020).

"Oracle Communications 5G Automated Testing Suite Guide," Oracle, Release 1.2.0, pp. 1-58 (Jul. 2020).

Lam et al., "Machine Learning based Anomaly Detection for 5G Networks," arXiv:2003.03474v1, pp. 1-12 (Mar. 7, 2020).

"ABoT Engagement Model," Rebaca Technologies, https://abot.rebaca.com/about-abot/abot-engagement-model/, pp. 1-3 (2020).

"ABoT—Cloud-Native 4G/5G Network Test Tool, Network Operators," Rebaca Technologies, https://www.rebaca.com/telecom/solutions, pp. 1-5 (2020).

"ABoT—Cloud-Native 4G/5G Network Test Tool, OEMs," Rebaca Technologies, https://www.rebaca.com/telecom/solutions, pp. 1-5 (2020).

"ABoT—Cloud-Native 4G/5G Network Test Tool, System Integrators," Rebaca Technologies, https://www.rebaca.com/telecom/solutions, pp. 1-4 (2020).

"AI Driven Tool in 5G Network," Rebaca Technologies, https://www.rebaca.com/insights-blogs/abot-test-orchestration-solution/ai-driven-tool-in-5g-network-rebaca-technologies, pp. 1-3 (2020).

"Methods for Testing and Specifications (MTS); Application of Model-Based Testing in the Telecoms Domain," ETSI TR 103 168, V1.1.1, pp. 1-15 (Feb. 2011).

Notification of Transmittal of the International Search Report and the Written Opinion of the International Searching Authority, or the Declaration for International Application No. PCT/US2022/020182 (dated May 31, 2022).

Katanic et al., "Automated generation of TTCN-3 test scripts for SIP-based calls," MIPRO, pp. 1-5 (May 24-28, 2010).

* cited by examiner

METHODS, SYSTEMS, AND COMPUTER READABLE MEDIA FOR AUTONOMOUS NETWORK TEST CASE GENERATION

TECHNICAL FIELD

The subject matter described herein relates to testing telecommunications networks. More particularly, the subject matter described herein relates to methods, systems, and computer readable media for autonomous network test case generation.

BACKGROUND

The $3^{rd}$ Generation Partnership Project (3GPP) is a collaboration between groups of telecommunications standards associations. The 3GPP defined mobile phone system specifications for telecommunications networks including 3G, 4G, and Long Term Evolution (LTE) networks.

The next generation network for 3GPP is the 5G network. The 5G specifications target high data rates, reduced latency, energy saving, cost reduction, higher system capacity, and increasing numbers of connected devices.

Multi-vendor environments deploy various 3GPP defined 5G network functions. In production deployments, failures/errors may be observed in network functions under different traffic scenarios. Telecommunications vendors are adopting to continuous integration/continuous delivery (CI/CD) processes. This introduces automated testing procedures before and after delivering the software.

In light of these and other difficulties, there exists a need for methods, systems, and computer readable media for autonomous network test case generation.

SUMMARY

A method for autonomously generating network function test cases includes detecting a failure case in a network function of a core network of a telecommunications network. The method includes, in response to detecting the failure case, autonomously generating a network function test case based on the failure case. The network function test case includes one or more network status parameters detected when detecting the failure case. The method includes supplying the network function test case to a network testing system configured for executing the network function test case by repeating the one or more network status parameters and determining whether or not the network function repeats the failure case.

According to another aspect of the subject matter described herein, detecting the failure case includes analyzing one or more network performance metrics or one or more network performance alerts or both.

According to another aspect of the subject matter described herein, detecting the failure case includes parsing one or more network function application logs or one or more network function traces or both.

According to another aspect of the subject matter described herein, executing the network function test case includes repeatedly executing the network function test case for a plurality of different network traffic conditions.

According to another aspect of the subject matter described herein, detecting the failure case includes supplying network function monitoring data to a machine learning classifier trained on training monitoring data for the network function.

According to another aspect of the subject matter described herein, supplying the network function test case to the network testing system includes associating the network function test case with the network function and one or more other network function test cases for the network function in a reference library of test cases for the core network of the telecommunications network.

According to another aspect of the subject matter described herein, supplying the network function test case to the network testing system includes determining that the network function test case is not already present in a reference library of test cases for the core network of the telecommunications network.

According to another aspect of the subject matter described herein, a system for autonomously generating network function test cases includes at least one processor and a memory. The system further includes an autonomous test case generator implemented by the at least one processor and configured for detecting a failure case in a network function of a core network of a telecommunications network, and, in response to detecting the failure case, autonomously generating a network function test case based on the failure case. The network function test case includes one or more network status parameters detected when detecting the failure case. The autonomous test case generator is configured for supplying the network function test case to a network testing system configured for executing the network function test case by repeating the one or more network status parameters and determining whether or not the network function repeats the failure case.

According to another aspect of the subject matter described herein, detecting the failure case includes analyzing one or more network performance metrics or one or more network performance alerts or both.

According to another aspect of the subject matter described herein, detecting the failure case includes parsing one or more network function application logs or one or more network function traces or both.

According to another aspect of the subject matter described herein, executing the network function test case includes repeatedly executing the network function test case for a plurality of different network traffic conditions.

According to another aspect of the subject matter described herein, detecting the failure case includes supplying network function monitoring data to a machine learning classifier trained on training monitoring data for the network function.

According to another aspect of the subject matter described herein, supplying the network function test case to the network testing system includes associating the network function test case with the network function and one or more other network function test cases for the network function in a reference library of test cases for the core network of the telecommunications network.

According to another aspect of the subject matter described herein, supplying the network function test case to the network testing system includes determining that the network function test case is not already present in a reference library of test cases for the core network of the telecommunications network.

According to another aspect of the subject matter described herein, a non-transitory computer readable medium having stored thereon executable instructions that when executed by a processor of a computer control the computer to perform steps is provided. The steps include detecting a failure case in a network function of a core network of a telecommunications network, and, in response to detecting the failure case, autonomously generating a network function test case based on the failure case. The network function test case includes one or more network status parameters detected when detecting the failure case. The steps include supplying the network function test case to a network testing system configured for executing the network function test case by repeating the one or more network status parameters and determining whether or not the network function repeats the failure case.

The subject matter described herein can be implemented in software in combination with hardware and/or firmware. For example, the subject matter described herein can be implemented in software executed by a processor. In one example implementation, the subject matter described herein may be implemented using a computer readable medium having stored thereon computer executable instructions that when executed by the processor of a computer control the computer to perform steps.

Example computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

The subject matter described herein relates to methods, systems, and computer readable media for preventing subscriber identifier leakage from a telecommunications network.

In 5G telecommunications networks, the network node that provides service is referred to as a producer network function (NF). A network node that consumes services is referred to as a consumer NF. A network function can be both a producer NF and a consumer NF depending on whether it is consuming or providing service. An NF instance is an instance of a producer NF that provides a service. A given producer NF may include more than one NF instance.

Multi-vendor environments deploy various 3GPP defined 5G network functions. In production deployments, failures/errors may be observed in network functions under different traffic scenarios. Telecommunications vendors are adopting to continuous integration/continuous delivery (CI/CD) processes. This introduces automated testing procedures before and after delivering the software.

Conventional systems lack a mechanism available to automatically generate test scenarios upon detection of failure. This specification describes methods and systems for detecting failure cases by analyzing application logs, alerts data, metrics data, traces data and preparing the test cases automatically. The test cases can act as an input to a testing system, e.g., a behavioral data driven test framework such as Oracle® Communications 5G Automated Testing Suite. The methods and systems described in this specification can be used for preparing reports for failure scenarios with relevant details for the core network.

Figure 1:
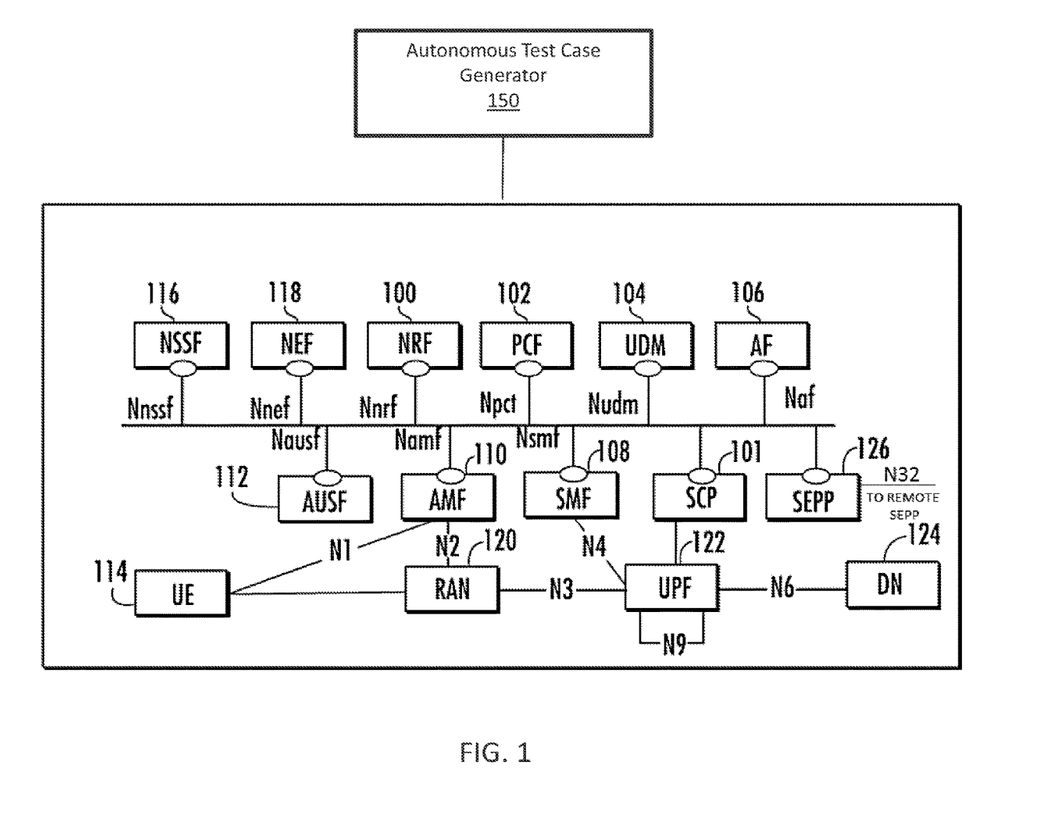
FIG. 1 is a block diagram illustrating an example 5G system network architecture.

FIG. 1 is a block diagram illustrating an example 5G system network architecture. The architecture in FIG. 1 includes NRF 100 and SCP 101, which may be located in the same home public land mobile network (HPLMN). NRF 100 may maintain profiles of available producer NF service instances and their supported services and allow consumer NFs or SCPs to subscribe to and be notified of the registration of new/updated producer NF service instances.

SCP 101 may also support service discovery and selection of producer NF instances. SCP 101 may perform load balancing of connections between consumer and producer NFs. In addition, using the methodologies described herein, SCP 101 may perform preferred NF location based selection and routing.

NRF 100 is a repository for NF or service profiles of producer NF instances. In order to communicate with a producer NF instance, a consumer NF or an SCP must obtain the NF or service profile or the producer NF instance from NRF 100. The NF or service profile is a JavaScript object notation (JSON) data structure defined in 3GPP Technical Specification (TS) 29.510.

In FIG. 1, any of the nodes (other than NRF 100) can be either consumer NFs or producer NFs, depending on whether they are requesting or providing services. In the illustrated example, the nodes include a policy control function (PCF) 102 that performs policy related operations in a network, a unified data management (UDM) function 104 that manages user data, and an application function (AF) 106 that provides application services.

The nodes illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality.

UPF 122 may also support performance measurement functionality, which may be used by UE 114 to obtain network performance measurements. Also illustrated in FIG.

1 is a data network (DN) 124 through which UEs access data network services, such as Internet services.

SEPP 126 filters incoming traffic from another PLMN and performs topology hiding for traffic exiting the home PLMN. SEPP 126 may communicate with an SEPP in a foreign PLMN which manages security for the foreign PLMN. Thus, traffic between NFs in different PLMNs may traverse two SEPP functions, one for the home PLMN and the other for the foreign PLMN.

FIG. 1 shows an autonomous test case generator 150. Autonomous test case generator 150 is part of, or in communication with, the core network of the telecommunications network. Autonomous test case generator 150 is implemented by at least one processor and configured for detecting a failure case in a network function of a core network of a telecommunications network, and, in response to detecting the failure case, autonomously generating a network function test case based on the failure case.

The network function test case includes one or more network status parameters detected when detecting the failure case. Autonomous test case generator 150 is configured for supplying the network function test case to a network testing system configured for executing the network function test case by repeating the one or more network status parameters and determining whether or not the network function repeats the failure case.

The telecommunications network core network can use autonomous test case generator 150 to realize one or more of the following advantages compared to some conventional systems:

Currently, 5G deployment can include various 5G network functions deployed using various deployment models serving different PLMNs and network slices Network operators and software vendors face a challenge to keep the network function healthy with zero or minimal downtime Automated testing systems can be a key priority for various network operators to use and adopt certain kinds of network functions.

Figure 2:
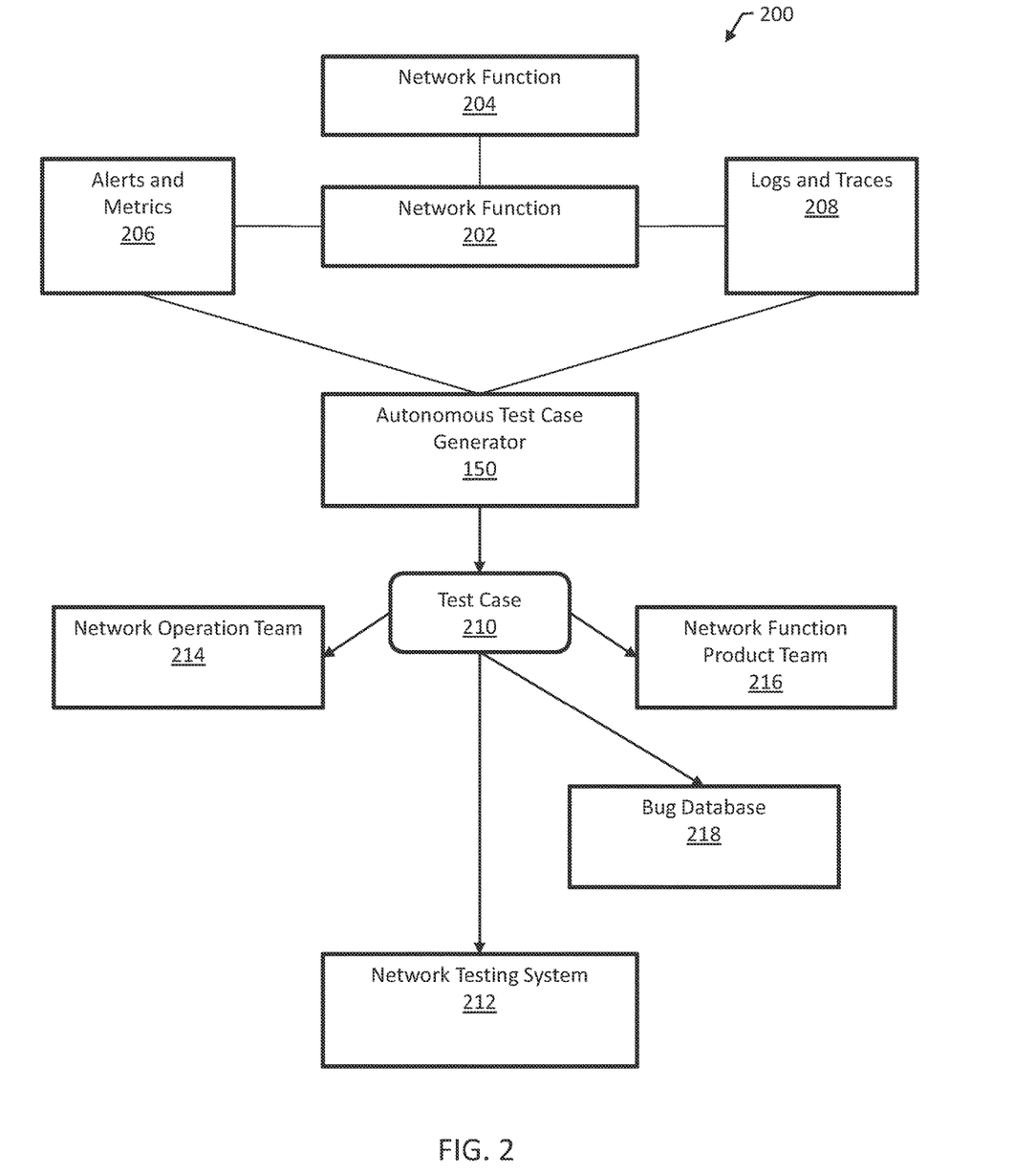
FIG. 2 is a block diagram of an example network environment for the autonomous test case generator.

Autonomous test case generator 150 can enable network operators and software vendors to keep enhancing test case suites in automated testing systems automatically Autonomous test case generator 150 can be useful when integrated into an overall core network system Autonomous test case generator 150 improve key performance indicators (KPIs) and service level agreements (SLA)s by detecting network function issues and reporting them, for example, to product teams and operation teams Autonomous test case generator 150 can be used to automatically create bug reports with details related to specific failures Autonomous test case generator 150 can be used to reduce the overhead of manual processes of detection and creation of 5G failure cases Autonomous test case generator 150 can be useful in creating robust core network functions Autonomous test case generator 150 can be used for periodically verifying network function integrity using automatically-generated test cases during specified times, for example, non-peak hours, to declare network functions that are operating according to specifications FIG. 2 is a block diagram of an example network environment 200 for the autonomous test case generator 150. Autonomous test case generator 150 is configured to detect a failure case of a first network function 202 by receiving monitoring data. Network function 202 may be, for example, a consumer of data from a second network function 204. Autonomous test case generator 150 can perform monitoring of both network function 202 and network function 204.

Monitoring data for network function 202 can include, for example, alerts and metrics 206 or logs and traces 208 or both. In some examples, detecting the failure case includes analyzing one or more network performance metrics or one or more network performance alerts or both. In some examples, detecting the failure case includes parsing one or more network function application logs or one or more network function traces or both.

In general, autonomous test case generator 150 can detect the failure case using any appropriate techniques. For example, detecting the failure case can include supplying network function monitoring data to a machine learning classifier trained on training monitoring data for the network function.

In response to detecting the failure case, autonomous test case generator 150 is configured for autonomously generating a network function test case 210 for network function 202 based on the failure case. Test case 210 specifies one or more network status parameters detected when detecting the failure case.

Test case 210 is supplied to an automated network testing system 212 configured for executing test case 210. Manual testing has classically come at a high cost of resources to run and maintain, can be time-consuming, lacks proper coverage and is error-prone due to repetitiveness. This has led to the introduction and attractiveness of automating these tests. Automation testing is used to improve the execution speed of verification, checks or any other repeatable tasks in the software development, integration and deployment lifecycle.

Automated network testing system 212 can be a behavioral data driven test framework such as Oracle® Communications 5G Automated Testing Suite. Automated Testing Suite (ATS) allows network operators to execute software test cases using an automated testing tool and then, compares the actual results with the expected or predicted results. In this process, there is no intervention from the user. ATS can be implemented as software that is used on the system under test to check if the system is functioning as expected and provides end-to-end and regression testing of 4G & 5G scenarios, including interworking test cases and Network Function (NF) emulation.

As network traffic evolves, test cases and reports can be updated. Using a testing system that undergoes regular test case reviews and that adjustments are made or new use cases tests are developed can be useful in keeping networks operating. In today's virtualized and cloud native environments, where 4G/5G applications are no longer deployed on proprietary hardware, changes in underlying environments can happen, and often outside the control of network operators. It is useful to use regression testing that is powerful, customized to your network operator needs and delivers meaningful reports and data. The ability to quickly deploy these new test cases can be especially useful for interworking and policy rule case additions which can be done expeditiously, run daily and include subscriber/subscription lifecycle.

For example, automated network testing system 212 can execute test case 210 by repeating the network status parameters and determining whether or not network function 202 repeats the failure case. In some examples, executing test case 210 includes repeatedly executing test case 210 for different network traffic conditions.

In some examples, automated network testing system 212 is configured for associating test case 210 with network function 202 and one or more other network function test cases for network function 202 in a reference library of test cases for the core network of the telecommunications network. Automated network testing system 212 and/or autonomous test case generator 150 can be configured for determining that the test case 210 is not already present in the reference library of test cases for the core network of the telecommunications network before adding test case 210.

Automated network testing system 212 can use any appropriate deployment model, for example:

In-Cluster Deployment
Out-Of-Cluster Deployment

According to In-Cluster deployment model, automated network testing system 212 can co-exist in the same cluster where the NFs are deployed. This deployment model is useful for In-Cluster testing.

According to Out-of-Cluster deployment model, a network operator can deploy automated testing system 212 in a separate cluster other than the one where NFs are deployed.

This deployment model is useful to perform "Out-of-cluster" testing as it is:

More aligned with the production use cases
Rare for all NFs to co-exist in the same cluster Test case 210 can be further supplied to a computer system of a network operation team 214, a computer system of a network function product team 216, and a bug database 218 storing software issues associated with network functions.

Figure 3:
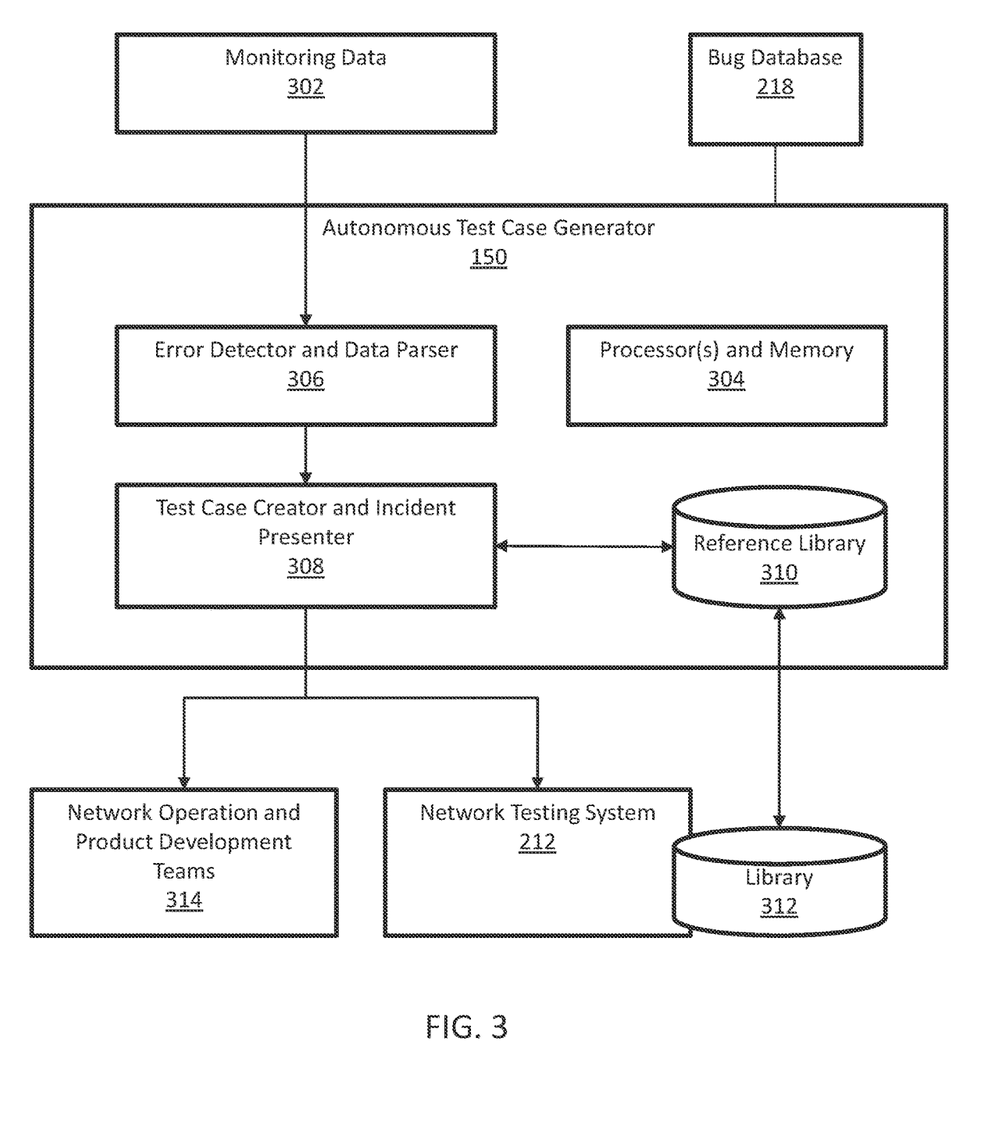
FIG. 3 is a block diagram illustrating an example structure of the autonomous test case generator.

FIG. 3 is a block diagram illustrating an example structure of the autonomous test case generator 150.

Autonomous test case generator 150 is configured for receiving monitoring data 302. Monitoring data 302 can include, for example, network functions logs, traces, metrics, and alerts from different network functions.

Autonomous test case generator 150 is implemented on at least one processor and a memory 304. Autonomous test case generator 150 can include an error detector and data parser 306 implemented on the at least one processor and memory 304. Autonomous test case generator 150 can include a test case creator and incident presenter 308 implemented on the at least one processor and memory 304.

In operation, error detector and data parser 306 can perform one or more of the following operations:

Error detector and data parser 306 can continuously receive and analyze monitoring data 302, e.g., the metrics, alerts, traces, and application logs of one or more network functions Error detector and data parser 306 can ensure that errors logs, traces, metrics, and alert information are collected when any failure takes place In some examples, error detector and data parser 306 can apply analytically-driven rules using machine-learning algorithms. For example, classification and regression trees (CART) can be applied on monitoring data collected and used to generate one or more error trigger points, for example, input service operations, data involved, uniform resource identifier (URI), and failure reasons.

Error detector and data parser 306 can include a machine-learning classifier trained on training data that is specific to the type of network function being monitored. A developer of the network function can supply appropriate training data that specifies expected operation of the network function, for example, under various network operational states.

In operation, test case creator and incident presenter 308 can perform one or more of the following operations:

Test case creator and incident presenter 308 can ensure that detected failures are checked against a reference test library 310 storing existing test cases. If a newly-detected test case is not part of an existing test suite, test case creator and incident presenter 308 can generate the test case, for example, by storing one or more network parameters detected in detecting the failure case.

Test case creator and incident presenter 308 can arrange test cases based on 5G N F-Type, 5G service operations, error category, or using any appropriate type of category.

Test case creator and incident presenter 308 can create the test case based on the detected failure case and send the test case to automated network testing system 212 if the test case is not present in reference test library 310. Automated network testing system 212 can, in turn, store the test case in a library 312 of test cases.

Test case creator and incident presenter 308 can transmit details of the detected failure case to computer systems of network operation and product development teams 314.

To illustrate the operation of autonomous test case generator 150, consider the following example of a 5G autonomous test case generator with processing for a hypertext transfer protocol (HTTP) code 500 type of detected failure case.

Suppose that error detector and data parser 306 detects an alert raised for failure by analyzing application logs and traces data received in monitoring data 302. Error detector and data parser 306 analyzes the detected failure case and determines that metric data includes a transmission failure response for HTTP code 500.

Error detector and data parser 306 can perform the following operations:

Find rules for HTTP status code 500
Use action items defined for the rule
Apply a machine learning algorithm, for example, CART
According to the classification and decision result from applying the machine learning algorithm, collect the 5G input data, for example:
Input 5G service operation
HTTP Message URL
HTTP Input Body
Error Message
Error metrics and alert details Test case creator and incident presenter 308 can then generate a 5G test case, for example, by storing data as follows:

Scenario: 5G NF PLMN-ID update
Expected Result: 200—OK—Success
URI: http://<http-api-root>/NFServiceOperation/5GN-FInstanceId
Case:
Given Initialize Test Suite
Given Initialize NF Connection with NFID1 ocnf-micro-serviceName.NFName NFPort
Then Use NF NFID1
Then Check And Set NF-Namespace
Then Send Custom Headers for NF NFID1 Content-Type=application/Jason-patch+json
Then Perform Partial NFProfile Update PlmnIdUp-dateInput.json NFID1
Then Validate HTTP Response Code 200
Then Set User Variable From HTTP Response nfInstaceId
Then Get NFInstance with NFID1

Test case creator and incident presenter 308 can then transmit the test case to automated network testing system 212.

Figure 4:
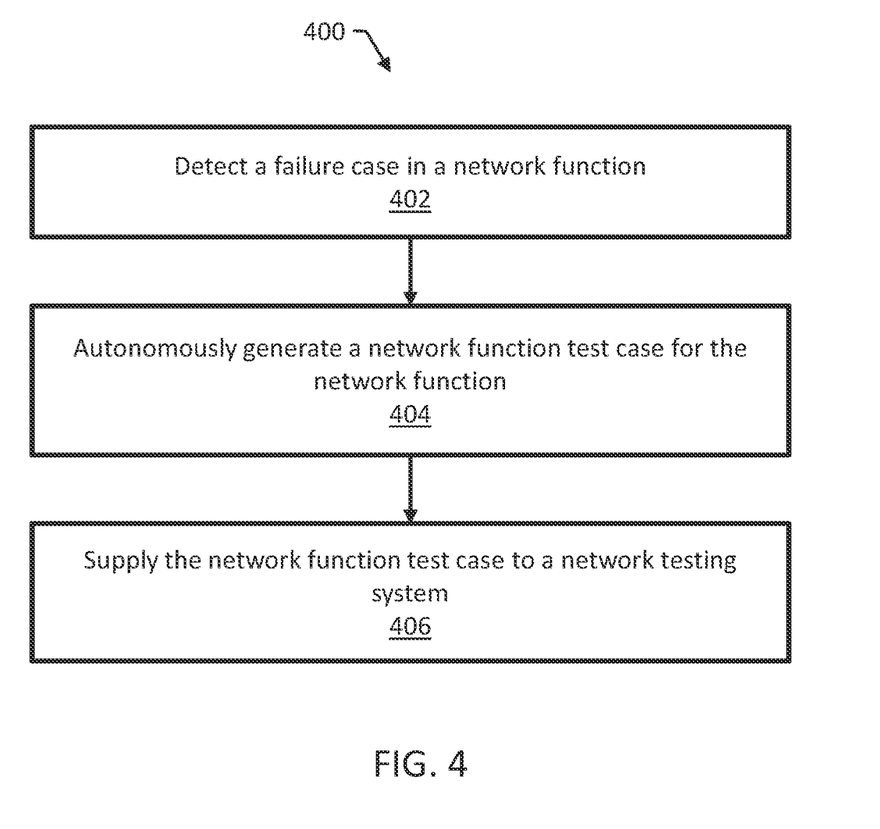
FIG. 4 is a flow diagram of an example method for autonomously generating network function test cases.

Test case creator and incident presenter 308 can then transmit a message containing incident details to computer systems for network operation and product development teams 314. For example, the message can specify:

Incident Time: < >
Incident Details: < >
ErrorMetric: TxErrorDetected [500]
ErrorAlert: AlertCriticalRate [500]
URI: http://<http-api-root>/NFServiceOperation/5GNFInstanceId
JSON Body: Content FIG. 4 is a flow diagram of an example method 400 for autonomously generating network function test cases.

Method 400 includes detecting a failure case in a network function of a core network of a telecommunications network (402). In some examples, detecting the failure case includes analyzing one or more network performance metrics or one or more network performance alerts or both. In some examples, detecting the failure case includes parsing one or more network function application logs or one or more network function traces or both.

In general, method 400 can include detecting the failure case using any appropriate techniques. For example, detecting the failure case can include supplying network function monitoring data to a machine learning classifier trained on training monitoring data for the network function.

Method 400 includes, in response to detecting the failure case, autonomously generating a network function test case based on the failure case (404). The network function test case includes one or more network status parameters detected when detecting the failure case. Network status parameters can be any appropriate type of data characterizing the operation of the network or the network function or both at the time of detecting the failure case or prior to detecting the failure case. For example, network status parameters can specify a network load, types of messages being sent, network function log data, and the like.

In general, generating the network function test case includes storing the network status parameters such that a network testing system can repeat the conditions that led to the failure case. In some cases, the network function test case can include operation parameters such as network load. In some cases, the network function test case can specify certain operations that happened prior to detecting the failure case.

For example, the network function test case can specify a sequence of messages that were sent to the network function prior to detecting the failure case. In those examples, an automated testing system can repeat the sequence of messages after an update to the network function to determine if the network function repeats the failure case.

Method 400 includes supplying the network function test case to a network testing system configured for executing the network function test case by repeating the one or more network status parameters and determining whether or not the network function repeats the failure case (406). In some examples, executing the network function test case includes repeatedly executing the network function test case for a plurality of different network traffic conditions.

Supplying the network function test case to the network testing system can include associating the network function test case with the network function and one or more other network function test cases for the network function in a reference library of test cases for the core network of the telecommunications network. Supplying the network function test case to the network testing system includes determining that the network function test case is not already present in a reference library of test cases for the core network of the telecommunications network.

The scope of the present disclosure includes any feature or combination of features disclosed in this specification (either explicitly or implicitly), or any generalization of features disclosed, whether or not such features or generalizations mitigate any or all of the problems described in this specification. Accordingly, new claims may be formulated during prosecution of this application (or an application claiming priority to this application) to any such combination of features.

In particular, with reference to the appended claims, features from dependent claims may be combined with those of the independent claims and features from respective independent claims may be combined in any appropriate manner and not merely in the specific combinations enumerated in the appended claims.

What is claimed is:

1. A method for autonomously generating network function test cases, the method comprising:
   detecting a failure case in a network function of a core network of a telecommunications network, wherein the telecommunications network is a 5G network and the network function is a 5G network function, and wherein detecting the failure case comprises parsing one or more network function application logs or one or more network function traces or both;
   in response to detecting the failure case, autonomously generating a network function test case based on the failure case, wherein the network function test case comprises one or more network status parameters detected when detecting the failure case, and wherein the network function test case specifies a sequence of network messages that were sent to the network function prior to detecting the failure case; and
   supplying the network function test case to a network testing system configured for executing the network function test case by repeating the one or more network status parameters and determining whether or not the network function repeats the failure case, wherein executing the network function test case comprises repeating the sequence of network messages after an update to the network function to determine if the network function repeats the failure case.

2. The method of claim 1, wherein detecting the failure case comprises analyzing one or more network performance metrics or one or more network performance alerts or both.

3. The method of claim 1, wherein executing the network function test case comprises repeatedly executing the network function test case for a plurality of different network traffic conditions.

4. The method of claim 1, wherein detecting the failure case comprises supplying network function monitoring data to a machine learning classifier trained on training monitoring data for the network function.

5. The method of claim 1, wherein supplying the network function test case to the network testing system comprises associating the network function test case with the network function and one or more other network function test cases for the network function in a reference library of test cases for the core network of the telecommunications network.

6. The method of claim 1, wherein supplying the network function test case to the network testing system comprises determining that the network function test case is not already present in a reference library of test cases for the core network of the telecommunications network.

7. A system for autonomously generating network function test cases, the system comprising:
   at least one processor and a memory; and
   an autonomous test case generator implemented by the at least one processor and configured for:
      detecting a failure case in a network function of a core network of a telecommunications network, wherein the telecommunications network is a 5G network and the network function is a 5G network function, and wherein detecting the failure case comprises parsing one or more network function application logs or one or more network function traces or both;
      in response to detecting the failure case, autonomously generating a network function test case based on the failure case, wherein the network function test case comprises one or more network status parameters detected when detecting the failure case, and wherein the network function test case specifies a sequence of network messages that were sent to the network function prior to detecting the failure case; and
      supplying the network function test case to a network testing system configured for executing the network function test case by repeating the one or more network status parameters and determining whether or not the network function repeats the failure case, wherein executing the network function test case comprises repeating the sequence of network messages after an update to the network function to determine if the network function repeats the failure case.

8. The system of claim 7, wherein detecting the failure case comprises analyzing one or more network performance metrics or one or more network performance alerts or both.

9. The system of claim 7, wherein executing the network function test case comprises repeatedly executing the network function test case for a plurality of different network traffic conditions.

10. The system of claim 7, wherein detecting the failure case comprises supplying network function monitoring data to a machine learning classifier trained on training monitoring data for the network function.

11. The system of claim 7, wherein supplying the network function test case to the network testing system comprises associating the network function test case with the network function and one or more other network function test cases for the network function in a reference library of test cases for the core network of the telecommunications network.

12. The system of claim 7, wherein supplying the network function test case to the network testing system comprises determining that the network function test case is not already present in a reference library of test cases for the core network of the telecommunications network.

13. A non-transitory computer readable medium having stored thereon executable instructions that when executed by a processor of a computer control the computer to perform steps comprising:
   detecting a failure case in a network function of a core network of a telecommunications network, wherein the telecommunications network is a 5G network and the network function is a 5G network function, and wherein detecting the failure case comprises parsing one or more network function application logs or one or more network function traces or both;
   in response to detecting the failure case, autonomously generating a network function test case based on the failure case, wherein the network function test case comprises one or more network status parameters detected when detecting the failure case, and wherein the network function test case specifies a sequence of network messages that were sent to the network function prior to detecting the failure case; and
   supplying the network function test case to a network testing system configured for executing the network function test case by repeating the one or more network status parameters and determining whether or not the network function repeats the failure case, wherein executing the network function test case comprises repeating the sequence of network messages after an update to the network function to determine if the network function repeats the failure case.

14. The non-transitory computer readable medium of claim 13, wherein detecting the failure case comprises analyzing one or more network performance metrics or one or more network performance alerts or both.

15. The non-transitory computer readable medium of claim 13, wherein executing the network function test case comprises repeatedly executing the network function test case for a plurality of different network traffic conditions.

16. The non-transitory computer readable medium of claim 13, wherein detecting the failure case comprises supplying network function monitoring data to a machine learning classifier trained on training monitoring data for the network function.

* * * * *